United States Patent
Hogan et al.

(10) Patent No.: US 6,806,307 B2
(45) Date of Patent: Oct. 19, 2004

(54) SYNTHESIS AND USE OF CHAIN-COUPLED POLYMERIC SULFIDE COMPOUNDS IN RUBBER FORMULATIONS

(75) Inventors: Terrence E. Hogan, Akron, OH (US); William L. Hergenrother, Akron, OH (US)

(73) Assignee: Bridgestone Corporation, Tokyo (JP)

(*) Notice: Subject to any disclaimer, the term of this patent is extended or adjusted under 35 U.S.C. 154(b) by 543 days.

(21) Appl. No.: 09/975,695

(22) Filed: Oct. 11, 2001

(65) Prior Publication Data

US 2003/0078335 A1 Apr. 24, 2003

(51) Int. Cl.[7] .................................................. C08K 3/34
(52) U.S. Cl. ................... 524/492; 524/495; 525/331.9; 525/332.3; 525/332.4; 525/332.8; 525/332.9; 525/333.1; 525/333.2; 525/333.3; 525/333.5; 525/337; 525/340; 525/341; 525/343; 525/355; 528/487; 528/491
(58) Field of Search ............................... 524/492, 495; 525/331.9, 332.3, 332.4, 332.8, 332.9, 333.1, 333.2, 333.3, 333.5, 337, 340, 341

(56) References Cited

U.S. PATENT DOCUMENTS

| | | | |
|---|---|---|---|
| 3,244,664 A | 4/1966 | Zelinski et al. .............. 260/41.5 |
| 4,083,834 A | 4/1978 | Komatsu et al. ............ 260/79.5 |
| 4,185,042 A | 1/1980 | Verkouw ..................... 525/332 |
| 4,433,114 A | 2/1984 | Coran et al. .............. 525/332.6 |
| 4,482,663 A | 11/1984 | Kraus .......................... 524/575 |
| 4,803,249 A | 2/1989 | Armand et al. ........... 525/326.2 |
| 4,835,221 A | 5/1989 | Bronstert et al. ......... 525/333.1 |
| 4,839,434 A | 6/1989 | Bronstert et al. ............ 525/350 |
| 5,508,333 A | 4/1996 | Shimizu ....................... 524/424 |
| 5,580,919 A | 12/1996 | Agostini et al. ............. 524/430 |
| 5,650,457 A | 7/1997 | Scholl et al. ................ 524/262 |
| 5,659,056 A | 8/1997 | Hergenrother et al. ...... 556/401 |
| 5,674,932 A | 10/1997 | Agostini et al. ............. 524/430 |
| 5,708,092 A | 1/1998 | Schwindeman et al. .... 525/272 |
| 5,719,249 A | 2/1998 | Fujita et al. ................... 528/27 |
| 5,916,956 A | 6/1999 | Wang et al. ................. 524/495 |
| 5,916,973 A | 6/1999 | Zimmer et al. ............. 525/236 |
| 6,008,295 A | 12/1999 | Takeichi et al. ............. 525/105 |
| 6,133,376 A | 10/2000 | Hsieh et al. ................. 525/101 |
| 6,252,007 B1 | 6/2001 | Oziomek et al. ......... 525/332.6 |
| 6,255,404 B1 | 7/2001 | Hogan et al. ............. 525/326.5 |
| 6,279,632 B1 | 8/2001 | Hogan et al. ................ 152/450 |

FOREIGN PATENT DOCUMENTS

| | | |
|---|---|---|
| DE | 2406092 | 8/1974 |
| EP | 219809 | 4/1987 |
| EP | 295675 | 12/1988 |
| EP | 0 801 112 | 10/1997 |
| EP | 1 031 604 | 8/2000 |
| EP | 1 061 097 | 12/2000 |
| FR | 2772386 | 6/1999 |
| WO | WO 8501293 | 3/1985 |
| WO | WO 0187993 | 11/2001 |

OTHER PUBLICATIONS

Wakefield, B.J. (1974). Cleavage of ethers and related compounds. The Chemistry of Organolithium Compounds. p. 199–202. Pergamon Press Ltd., Oxford.

Morton, M. and R.E. Kammerack (1970). Nucleophilic substitution at bivalent sulfur. Reaction of alkyllithium with cyclic sulfides. *J. Amer. Chem. Soc.* 92, 3217–3218.

*Primary Examiner*—Edward J. Cain
(74) *Attorney, Agent, or Firm*—Meredith E. Palmer; Barbara E. Arndt

(57) ABSTRACT

The invention provides chain-coupled polymeric sulfide compounds for use as the elastomeric component in vulcanizable elastomeric compositions comprising silica, carbon black or mixtures thereof. In particular, the invention provides anionically polymerized polymers having polymer chain living ends that are functionalized with sulfide groups and coupled together by a metal or nonmetal atom. The chain-coupled polymeric sulfide compounds have an initial high viscosity for ease of handling prior to compounding, a stable viscosity during storage, and a decreased compound viscosity for better filler dispersion and improved mixing efficiency. The invention further provides a pneumatic tire having at least one component produced from the vulcanizable elastomeric composition of the invention. A tire tread produced from vulcanized elastomers exhibiting these improved properties will exhibit reduced hysteresis resulting in an increase in rebound and improved rolling resistance and wet traction.

29 Claims, 1 Drawing Sheet

SYNTHESIS AND USE OF CHAIN-COUPLED POLYMERIC SULFIDE COMPOUNDS IN RUBBER FORMULATIONS

FIELD OF THE INVENTION

The invention generally relates to polymers employed in carbon black- and/or silica-filled vulcanizable elastomeric compositions.

BACKGROUND OF THE INVENTION

When producing polymers for use in rubber articles, such as tires, power belts, and the like, it is desirable that these polymers are easily processable during compounding and have a high molecular weight with a controlled molecular weight distribution, glass transition temperature ($T_g$) and vinyl content. It is also desirable that reinforcing fillers, such as carbon black and/or silica, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties, will have reduced hysteresis resulting in an increase in rebound, better rolling resistance, snow and ice traction, wet traction, and improved fuel economy for vehicles equipped with such tires.

With the increasing use of silica as a reinforcing filler for rubber, filler dispersion in rubber stocks has become a major concern. Because polar silanol groups on the surface of silica particles tend to self-associate, reagglomeration of silica particles occurs after compounding, leading to poor silica dispersion, a high compound viscosity and a shorter scorch time. One approach to achieving better dispersion of silica and/or carbon black during compounding involves termination of elastomeric polymers, such as diene rubbers, with a tin-containing coupling agent, such as tin tetrachloride, an organo-tin halide, a dialkyldioxastannylane compound, and the like, resulting in an increase in the Mooney viscosity of the gum polymer, which is desirable for better initial processability of the polymer. During compounding of the tin-functionalized polymers, the polymer carbon-tin bonds are cleaved, resulting in lower molecular weight fragments and, concomitantly, a lowered viscosity which allows better dispersability of the filler during compounding. Such an approach is described, for example, in U.S. Pat. No. 6,252,007.

Another approach to improving dispersion of silica and/or carbon black filler, involves modification of polymer chains with functional end groups that interact with or shield the surface hydroxyl groups on the silica filler. In particular, alkoxysilane-terminated polymers are well known and their preparation is disclosed in U.S. Pat. Nos. 3,244,664 and 4,185,042. Alkoxysilane-terminated polymers have a carbon-silicon bond and at least one terminal O-R group that reacts with the silica surface, forming an Si—O—Si linkage.

Yet another approach to improving silica and/or carbon black dispersion involves the use of polymeric alkoxide compounds that are coupled through alkoxysilane linkages, and which are susceptible to hydrolysis under compounding conditions, resulting in decreased Mooney viscosity and improved filler dispersion. This approach is disclosed in our co-owned, copending U.S. patent application Ser. No. 09/570,578.

Although the above methods of improving filler dispersion and decreasing hysteresis of the resulting rubber compound have been shown to be successful, the need continues for alternative methods for improving the physical properties of rubber compounds, especially those used for tire treads.

SUMMARY OF THE INVENTION

The invention provides chain-coupled polymeric sulfide compounds that are especially useful as high molecular weight polymers in vulcanizable elastomeric compositions comprising silica, carbon black, or mixtures of silica and carbon black as reinforcing fillers. These compounds are particularly suitable for rubber making because of their processability, i.e., they have an initial high molecular weight (high viscosity) at synthesis for ease of handling prior to compounding, and they are extremely resistant to any increase in viscosity due to the presence of moisture during desolventization or storage prior to compounding. During compounding, the viscosity of the polymers decreases as polymer chains become decoupled, to provide a reduced viscosity and improved interaction with the reinforcing filler for better filler dispersion. Moreover, the viscosity of the resulting compound provides for good processability during extrusion or molding of the compound at the tire plant.

The use of the invention chain-coupled polymeric sulfide compounds in vulcanized elastomeric compounds for tire treads provides reduced hysteresis, resulting in an increase in rebound, better rolling resistance, snow and ice traction, and wet traction.

In particular, the polymeric sulfide compounds of the invention have the formula

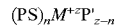

where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z. Preferably the metal atom is selected from the group consisting of atoms of silicon, tin, titanium aluminum, arsenic, copper, calcium, zinc, lead, mercury and cadmium. More preferably, the metal atom is silicon.

In one embodiment of the invention, the polymer chain is selected from the group consisting of homopolymers of conjugated diene monomers, and copolymers and terpolymers of the conjugated diene monomers with monovinyl aromatic monomers and trienes. Preferably, the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

In another embodiment of the invention, one or more of these polymeric sulfide compounds are employed as the elastomeric component in a sulfur vulcanizable elastomeric composition including a reinforcing filler selected from the group consisting of silica, carbon black, and mixtures thereof, and a cure agent. The invention further provides a pneumatic tire having at least one component produced from the vulcanizable elastomeric composition.

The invention further provides a method for making the polymeric sulfide compound and a method for improving the mixing efficiency during compounding of an elastomer with a reinforcing filler by the use of the polymeric sulfide compound described above as the elastomeric component.

DETAILED DESCRIPTION OF THE INVENTION

Figure 1:
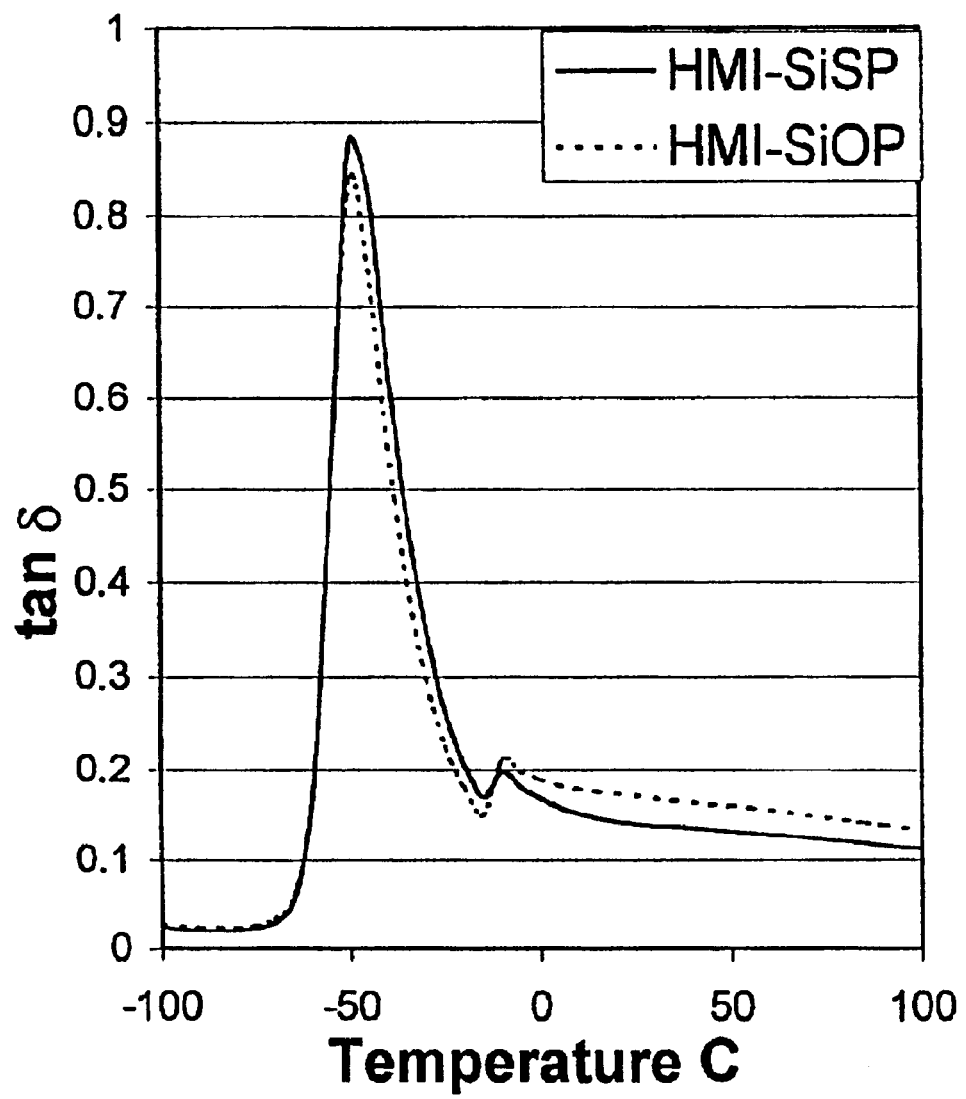
FIG. 1 is a plot of the tan δ vs. the temperature for two vulcanizable elastomeric compounds. The invention compound contains the chain-coupled polymeric sulfide compound of the invention (SiSP), and the comparison compound contains a chain-coupled polymeric alkoxide compound (SiOP).

The invention relates to polymeric sulfide compounds having the formula $$(PS)_n M^{+z} P'_{z-n}$$

where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur, and n is an integer having a value of from 1 to z. Preferably, the metal atom is selected from the group consisting of atoms of silicon, tin, titanium, aluminum, arsenic, copper, calcium, zinc, lead, mercury and cadmium, as discussed further below. More preferably, the metal atom is silicon. The oxidation state of the metal or nonmetal atom (z) may range from 2 to 6, but preferably ranges from 4 to 6. For purposes of simplicity, silicon is considered herein to be a metal; however, one skilled in the art will understand that a silicon atom may act as either a metal or a nonmetal atom in the invention compounds.

The polymer chain P of the polymeric sulfide compound is preferably produced by solution anionic polymerization of monomers in the presence of an anionic polymerization initiator in an inert, anhydrous, aprotic solvent. Each polymer chain so produced has a single living end terminated with a metal atom derived from the initiator. When polymerization is complete, but while the polymer is still in the presence of the inert solvent, the living end of the polymer is first reacted with an alkylene sulfide compound having the formula

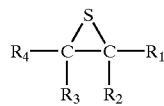

where $R_1$, $R_2$, $R_3$ and $R_4$ are the same of different from each other, and are independently selected from the group consisting of hydrogen atoms, alkyls having one to about 30 carbon atoms, aromatics having about 6 to about 20 carbon atoms, and cycloalkyls having about 5 to about 20 carbon atoms.

Exemplary alkylene sulfide compounds include, but are not limited to, ethylene sulfide, propylene sulfide, cyclohexene sulfide, cyclopentene sulfide and styrene sulfide.

While still in the inert solvent, the sulfur-terminated polymer chains are subsequently coupled together by a reaction with a coupling agent containing a metal or non-metal atom having the formula $$M^{+z} X_{z-m} R_m$$

where $M^{+z}$ and R are the same as above, X is a halide; (z−m) represents an integer having a value of at least 2, and m is zero or an integer having a value of 1 to (z−2).

Any anionically polymerizable monomers may be employed to form homopolymer, copolymer or terpolymer chains (P) of the invention polymeric sulfide compounds. For example, in one embodiment of the invention, alkylene oxide monomers such as, but not limited to, ethylene oxide, propylene oxide, styrene oxide, cyclohexene oxide, cyclopentene oxide, and the like, may be anionically polymerized to form polyethylene oxide, polypropylene oxide, polystyrene oxide, polycyclohexene oxide or polycyclopentene oxide homopolymers, or copolymers or terpolymers comprising the monomers. In another embodiment of the invention alkylene sulfide monomers such as, but not limited to, ethylene sulfide, propylene sulfide, styrene sulfide, cyclohexene sulfide, cyclopentene sulfide, and the like, may be anionically polymerized to form polyethylene sulfide, polypropylene sulfide, polystyrene sulfide, polycyclohexene sulfide or polycyclopentene sulfide homopolymers, or copolymers or terpolymers comprising the monomers. In another embodiment, styrene monomers are anionically polymerized to form polystyrene.

In yet another embodiment of the invention, conjugated diene monomers, monovinyl aromatic monomers, triene monomers, and the like, may be anionically polymerized to form homopolymers of conjugated diene monomers, and copolymers or terpolymers of the conjugated diene monomers with monovinyl aromatic monomers and trienes. Thus, the elastomeric products may include diene homopolymers from monomer A and copolymers thereof with monovinyl aromatic monomers B. Exemplary diene homopolymers are those prepared from diolefin monomers having from 4 to about 12 carbon atoms. Exemplary vinyl aromatic copolymers are those prepared from monomers having from 8 to about 20 carbon atoms. Copolymers can comprise from about 99 to 10 percent by weight of diene units and from about 1 to about 90 percent by weight of monovinyl aromatic or triene units, totaling 100 percent. The polymers, copolymers and terpolymers of the present invention may have 1,2-microstructure contents ranging from about 10 to about 80 percent, with the preferred polymers, copolymers or terpolymers having 1,2-microstructure contents of from about 25 to 65 percent, based upon the diene content. The elastomeric copolymers are preferably random copolymers which result from simultaneous copolymerization of the monomers A and B with randomizing agents, as is known in the art.

Preferred polymers as the polymeric component of the invention chain-coupled polymeric sulfide compound for use in a vulcanizable elastomeric composition include polyisoprene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, and organo-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about 8 carbon atoms. Although the hydrocarbyl group is preferably an aliphatic group, the hydrocarbyl group can also be cycloaliphatic or aromatic. The aliphatic group may be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes, in accordance with the process of the present invention include, but are not limited to, n-butyl lithium, n-propyl lithium, isobutyl lithium, tertiary butyl lithium, amyllithium, cyclohexyl lithium, and the like, and especially tributyl tin lithium as disclosed in our co-owned U.S. Pat. No. 5,268,439. Other suitable organo-lithium compounds for use as anionic initiators are well known to those skilled in the art. Mixtures of different lithium initiator compounds also can be employed. The preferred organo-lithium initiator is n-butyl lithium, and "in situ" produced lithium hexamethyleneimide initiator prepared by reacting hexamethyleneimine and n-butyl lithium, as disclosed in our co-owned U.S. Pat. No. 5,496,940.

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles of lithium per 100 grams of monomers up to about 100 millimoles of lithium per 100 grams of monomers, depending upon the desired polymer molecular weight. In particular, for rubber applications, the desired number average molecular weight of the polymer prior to coupling is about 80,000 to 150,000, and after coupling is about 100,000 to about 500,000.

Polymerization is usually conducted in a conventional inert, anhydrous, aprotic solvent for anionic polymerizations, such as hexane, cyclohexane, benzene, and the like. Various techniques for polymerization, such as semi-batch and continuous polymerization may be employed. In order to promote randomization in copolymerization and to increase vinyl content, a polar coordinator may optionally be added to the polymerization ingredients. Amounts range between about 0.1 to about 90 or more equivalents per equivalent of initiator metal (e.g., lithium, sodium or potassium). The amount depends upon the type of polar coordinator that is employed, the amount of vinyl desired, the level of styrene, if employed, and the temperature of the polymerizations, as well as the selected initiator.

Compounds useful as polar coordinators are organic and include tetrahydrofuran, linear and cyclic oligomeric oxolanyl alkanes such as 2-2'-di(tetrahydrofuryl) propane, di-piperidyl ethane, hexamethylphosphoramide, N—N'-dimethylpiperazine, diazabicyclooctane, dimethyl ether, diethyl ether, tributylamine, and the like. The linear and cyclic oligomeric oxolanyl alkane polar coordinators are described in U.S. Pat. No. 4,429,091, the subject matter of which related to polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is preferred to maintain the peak temperature at from about 45° C. to about 150° C., and more preferably from about 60° C. to about 100° C. Polymerization is allowed to continue under agitation for about 0.15 to 24 hours. After polymerization is complete, the living end of the polymer chain is reacted with an alkylene sulfide compound, followed by coupling of the polymer chains by the metal halide coupling agent, as described in greater detail herein below. The molar ratio of polymer to alkylene sulfide compound determines the number of polymer chains that are reacted with the alkylene sulfide compound.

For example, an organo-lithium initiator, such as n-butyl lithium, may be used to polymerize a polymer (P) having an $Li^+$ living end that is reacted with an alkylene sulfide compound to produce $P—S^-Li^+$ polymer chains. The addition of 0.75 moles of the alkylene sulfide compound to 1.0 moles of polymer results in a mixture containing 0.75 moles $P—S^-Li^+$ chains and 0.25 moles $P^-Li^+$ chains. Similarly, the addition of 0.5 moles of the alkylene sulfide compound to 1.0 moles of polymer results in a mixture containing 0.5 moles of $P—S^-Li^+$ chains and 0.5 moles of $P^-Li^+$ chains; a molar ratio of 1.0 moles alkylene sulfide compound to 1.0 mole of polymer results in virtually all $P—S^-Li^+$ chains; and a molar ratio of 0.25 moles alkylene sulfide compound to 1.0 moles of polymer results in a mixture containing 0.25 moles $P—S^-Li^+$ chains and 0.75 moles $P^-Li^+$ chains.

The metal halide coupling agent reacts with the sulfur-modified living end of the polymer chains to produce coupled polymer chains such as those having the formulas: $(P—S)_z-M^z$; $(PS)_{z-1}-M^z-P'$; $(PS)_{z-2}-M^z-P'_2$; and the like, when m is zero. Moreover, when m is not zero, up to $(z-2)$ R groups may be coupled to the metal or nonmetal atom, in addition to two or more polymer P' or PS chains.

The alkylene sulfide terminating agent is added to the reaction vessel and the vessel is agitated for about 0.1 to about 4.0 hours. The coupling agent is then added to the vessel, and agitation continues for a further about 0.1 to about 4 hours. For purposes of comparison with the invention polymeric sulfide compounds in examples described below, other comparative polymers may be terminated by a different quenching agent, an endcapping agent, or a coupling agent, as is known to those skilled in the art. Whatever terminating agent is employed, it is added to the reaction vessel after polymerization is complete, and the vessel is agitated for about 0.1 to about 4.0 hours. Quenching is usually conducted by stirring the polymer and quenching agent for about 0.01 hours to about 1.0 hour at temperatures of from about 20° C. to about 120° C. to ensure a complete reaction. The polymers of the invention are subsequently quenched with an alcohol or other quenching agent.

Lastly, the solvent is removed from the polymer by conventional techniques such as drum drying, extruder drying, vacuum drying or the like, which may be combined with coagulation with heated water, alcohol or steam. If coagulation with heated water or steam is used, oven drying may be desirable. As discussed above, in commercial operations, desolventization is most frequently achieved by the use of heated water or steam.

Various techniques known in the art for carrying out polymerizations may be used to form the chain-coupled polymeric sulfide compounds of the invention without departing from the scope of the present invention.

The metal halide coupling agent is preferably selected from the group consisting of silicon tetrachloride, alkyltrichlorosilane, dialkyldichlorosilane, silicon tetrabromide, alkyltribromosilane, dialkyldibromosilane, tin tetrachloride, alkyl tin trichloride, dialkyl tin dichloride, tin tetrabromide, alkyl tin tribromide, dialkyl tin dibromide, titanium tetrachloride, alkyl titanium trichloride, dialkyl titanium dichloride, titanium tetrabromide, alkyl titanium tribromide, dialkyl titanium dibromide, aluminum trichloride, alkyl aluminum dichloride, aluminum tribromide, alkyl aluminum dibromide, arsenic trichloride, alkyl arsenic dichloride, arsenic tribromide, alkyl arsenic dibromide, boron trichloride, alkyl boron dichloride, boron tribromide, alkyl boron dibromide, nitrogen trichloride, alkyl nitrogen dichloride, nitrogen tribromide, alkyl nitrogen dibromide, phosphorus trichloride, alkyl phosphorus dichloride, phosphorus tribromide, alkyl phosphorus dibromide, copper dichloride, copper dibromide, calcium dichloride, calcium dibromide, zinc dichloride, zinc dibromide, sulfur dichloride, and mixtures thereof.

Preferably, the coupling agent is a halosilane and the chain-coupled polymeric sulfide compounds are thioalkoxysilane coupled polymers.

It is preferred that the polymers according to the present invention have at least about 20 percent chain coupling. That is, about 20 percent of the polymer mass after coupling is of higher molecular weight than the polymer before coupling as measured, for example, by gel permeation chromatography. Preferably, before coupling, the polydispersity (the ratio of the weight average molecular weight to the number average molecular weight) of the polymers can be controlled over a wide range, from 1 to about 20, preferably 1 to about 5, and more preferably 1 to about 2. It is recognized that the polymers according to the present invention may contain from about 10 to about 80 percent by weight of coupled polymer containing polymer carbon-M bonds, and correspondingly from about 90 to about 20 percent by weight of polymer containing polymer-S-M bonds, where the metal groups are derived from the reaction of the metal halide coupling agent with the sulfur-modified chain ends. However, the preferred compositions contain at least two polymer-S-M bonds, and preferably contain three or more polymer-S-M bonds, i.e., the preferred polymers of the invention have the formula $(PS)_{z-1}M^z$-P' and $(PS)_zM^z$.

As is known in the art, the chain-coupled polymeric sulfide compounds of the present invention may contain a functional group derived from anionic polymerization initiator at the head (initiator) end of the polymer chain, in addition to the functional group derived from the coupling agent at the terminal end of the chain. These functional groups may have an affinity for compounding filler materials such as silica or carbon black.

To provide a better understanding of the process of preparation of the polymeric sulfide compounds of the invention, the following example, which is not intended to limit the scope of the invention, is provided.

Styrene-butadiene (SBR) copolymer chains, produced by solution anionic polymerization employing n-butyl lithium as the initiator are reacted with ethylene sulfide in a ratio of 1.0 mole ethylene sulfide to 1.0 mole SBR; and the resulting sulfur-modified polymer chains are coupled together employing silicon tetrachloride (SiCl$_4$) as the coupling agent, in the reactions illustrated as Scheme I below.

Scheme I

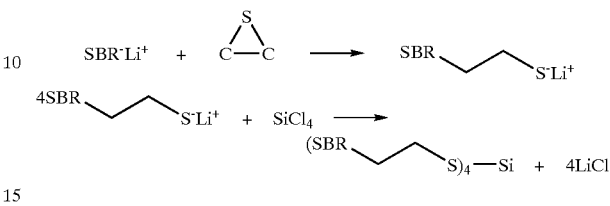

Varying the molar ratios of the alkylene sulfide to the polymer chains (P), and coupling with silicon tetrachloride, results in coupled polymeric sulfide products, such as (P—S)$_4$—Si; (P—S)$_3$—Si—P'; (P—S)$_2$—Si—(P')$_2$, and the like, illustrated as Scheme II below.

Scheme II

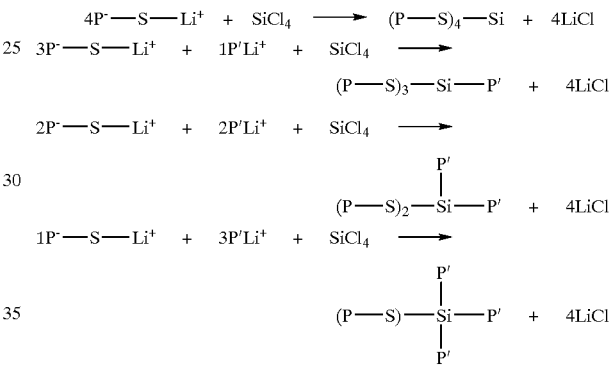

It will be appreciated that, in contrast to siloxane-terminated polymers having a hydrolyzable substituent group, the chain-coupled polymeric sulfide compounds of the invention do not exhibit a substantial increase in molecular weight (increased Mooney viscosity) when they are exposed to moisture during desolventization with steam or heated water, or storage in ambient environmental conditions, especially hot, humid conditions. Rather, the coupled polymer chains sterically inhibit the access of water to the hydrolyzable groups. The longer the polymer chains, the more difficult it is for the hydrolysis reaction to occur. Therefore, high molecular weight polymers are less likely to undergo hydrolysis and coupling of polymers than low molecular weight polymers. Of course, hydrolysis will eventually occur over time regardless of the polymer molecular weight, but not without difficulty.

A further advantage of the chain-coupled polymeric sulfide compounds of the invention is exhibited during compounding of these polymers with a reinforcing filler, such as silica, carbon black, or mixtures of these, and other ingredients described below, to produce a sulfur vulcanizable elastomeric composition. In particular, in the presence of heat and moisture during compounding, the polymer chains uncouple due to hydrolysis, as illustrated below in Scheme III but, rather than forming polymer-S—Si—S-polymer bonds, the reactive polymer-S—Si groups react with the silica filler in the presence of moisture, thus shielding the silanol groups on the silica filler and binding the silica to the rubber.

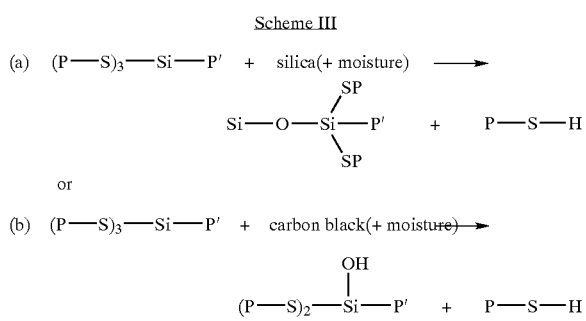

Hydrolysis of the coupled polymer-S—Si bonds in the presence of heat and moisture during compounding, results in lower molecular weight of the polymers, resulting in a decrease in the viscosity of the mixture, whether the reinforcing filler is silica or carbon black.

The P—S—H functionality may react with the polymer backbone unsaturation during cure, thus reducing the number of chain ends and reducing hysteresis.

Although, in the examples provided above, the polymer chains are coupled by a silica (Si) group having a valence of 4, any of the metal or nonmetal atoms, M, derived from coupling agents containing silicon, tin, titanium, aluminum, arsenic, copper, calcium, zinc, lead, mercury, cadmium, phosphorus, boron, nitrogen or sulfur, may be used in embodiments of the invention.

Compounding of the chain-coupled polymeric sulfide compounds with a reinforcing filler such as silica, carbon black or mixtures of these fillers, results in better mixing efficiency (e.g., a shorter mixing time is required to achieve the required mixing energy), due to the progressive decrease in the Mooney viscosity of the mixture, in comparison to the mixing time of an equivalent vulcanizable elastomeric compound comprising the same polymer which is not coupled and has a similar weight average molecular weight to the invention polymer prior to coupling. The processability of both compounds will, however, be similar in downstream applications, e.g., extrusion, because the invention polymer will be decoupled, and both of the polymers will have the same weight average molecular weight.

Therefore, the invention also provides a method for improving mixing efficiency during compounding of an elastomer with a reinforcing filler, comprising the steps of providing a chain-coupled polymeric sulfide compound having the formula disclosed herein; mixing the polymer in a mixer with a reinforcing filler selected from the group consisting of silica, carbon black, and mixtures thereof; providing a source of moisture; heating the mixture to a temperature of about 60° C. to about 200° C.; wherein during the mixing step up to "n" S-M groups are hydrolyzed in the presence of the moisture and heat resulting in uncoupling of up to "n" polymer chains and a decrease in the viscosity of the mixture, and wherein the mixing time to achieve a desired mix energy is decreased in comparison to the mixing time of an equivalent vulcanizable elastomeric compound comprising the same polymer, not coupled, and having a similar weight average molecular weight as the invention polymer prior to coupling. The improvement in mixing efficiency during compounding of the invention polymer is further evident at temperatures of about 90° C. to about 190° C., typically temperatures of about 105° C. to about 185° C., and especially temperatures of about 120° C. to about 180° C., more especially temperatures of about 155° C. to about 180° C. The source of moisture is typically moisture associated with the reinforcing filler, especially silica.

When the polymeric sulfide compounds of the invention are prepared with alkylene sulfide compounds containing bulky alkylene groups, steric hindrance to the entry of water molecules for hydrolysis of the P—S-M bonds may be present. Consequently, when the alkylene groups are bulky, it may be necessary to add a catalyst. For example, a suitable catalyst is a strong base having a pK in the range of about 0.8 to about 12. An exemplary suitable catalyst is a guanidine, such as, but not limited to, diphenyl guanidine (DPG.) Although the catalyst may be added to any stage of the compounding mixing process, it is preferably added to the master batch (initial) stage to promote uncoupling of the polymer chains at the beginning of the compounding process.

Vulcanizable elastomeric compositions of the invention can be prepared by compounding or mixing the chain-coupled polymeric sulfide compounds herein with carbon black, silica, preferably precipitated silica (silicon dioxide), or mixtures of carbon black and silica, in addition to other conventional rubber additives including, for example, other fillers, plasticizers, antioxidants, curing agents and the like, using standard rubber mixing equipment and procedures. For example, the vulcanizable elastomeric composition of the present invention can be obtained by milling the components by using a milling apparatus, such as a mill, an internal mixer, and the like. Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

The polymeric sulfide compounds of the present invention can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely with a lower limit comprising about 10 to 20 percent by weight of the total rubber. The minimum amount will depend primarily upon the degree of hysteresis reduction desired. Thus, the compounds can contain 10 to 100 percent by weight of the inventive polymeric sulfide compound, with the balance, if any, being a conventional rubber.

Examples of silica fillers which may be used in the vulcanizable elastomeric composition of the invention include wet silica (hydrated silicic acid), dry silica (anhydrous silicic acid), calcium silicate, and the like. Other equivalent useful fillers include aluminum silicate, clay, talc, calcium carbonate, basic magnesium carbonate, hydrated alumina, diatomaceous earth, barium sulfate, mica, aluminum sulfate, titanium oxide, aluminum hydroxide, aluminum oxide and the like. Among these, precipiated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts per 100 parts of the total polymer component (phr), preferably in an amount from about 5 to about 80 phr. The useful upper range is limited by the high viscosity imparted by fillers of this type. Some of the commercially available silicas which may be used include, but are not limited to, Hi-Sil® 190, Hi-Sil® 210, Hi-Sil® 215, Hi-Sil® 233, Hi-Sil® 243, and the like, produced by PPG Industries. A number of useful commercial grades of different silicas are also available from DeGussa Corporation (e.g., VN2, VN3), Rhone Poulenc (e.g., Zeosil 1165 MP), and J.M. Huber Corporation.

The polymeric sulfide compounds can be compounded with all forms of carbon black in amounts ranging from about 5 to 50 parts by weight, per 100 parts of polymer (phr), with less than about 35 phr being preferred. The carbon blacks may include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM test D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FIT) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention may be in pelletized form or an unpelletized flocculent mass. Preferably, for more uniform mixing, unpelletized carbon black is preferred.

It is readily understood by those having skill in the art that the rubber composition would be compounded by methods generally known in the rubber compounding art, such as mixing the various sulfur-vulcanizable constituent polymer (s) with various commonly used additive materials such as for example, curing aids, such as sulfur, activators, retarders and accelerators, processing additives, such as oils, resins, including tackifying resins, plasticizers, pigments, fillers, fatty acid, zinc oxide, waxes, antioxidants and antiozonants, peptizing agents. As known to those skilled in the art, depending on the intended use of the sulfur vulcanizable and sulfur vulcanized material (rubbers), the additives mentioned above are selected and commonly used in conventional amounts.

Typical amounts of tackifer resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example diphenyl-p-phenylenediamine and others, such as for example, those disclosed in the *Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr. Typical amounts of zinc oxide comprise about 2 to about 5 phr. Typical amounts of waxes comprise about 1 to about 2 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include "rubbermaker's" soluble sulfur, sulfur donating vulcanizing agents, such as an amine disulfide, polymeric polysulfide or sulfur olefin adducts; and insoluble polymeric sulfur. Preferably, the sulfur vulcanizing agent is soluble sulfur or mixtures of soluble and insoluble polymeric sulfur. The sulfur vulcanizing agents are used in an amount ranging from about 0.1 to about 10 phr, often in the range of about 0.5 to about 5 phr, with a range of about 1.5 to about 3.5 phr being preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenyl guanidine and the like. The amount of the vulcanization accelerator used is about 0.1 to about 5 phr, preferably about 0.2 to about 3 phr.

The vulcanizable elastomeric composition of the present invention can be obtained by mixing the components by using a milling apparatus, such as a mill, an internal mixer, and the like. The ingredients are typically mixed in two or more stages, consisting of at least a "master batch" stage in which at least a portion of the polymeric sulfide compound, silica, carbon black, and other ingredients are mixed at a high temperature, which may be from about 165 C to about 200 C, and a lower temperature "final stage", in which the curing agents are typically added. There may also be intermediate mixing stages in which the mixture is re-milled with or without the addition of ingredients. The mixing temperature and mixing times may vary from stage to stage, as is known to those skilled in the art.

EXAMPLES

The following examples illustrate methods of preparation of the polymeric sulfide compounds of the present invention, and their use in compounding formulations. However, the examples are not intended to be limiting, as other methods for preparing these compounds and different compounding formulations may be determined by those skilled in the art. Thus, the polymer preparation is not limited to the specific monomers, reactants, initiators, alkylene sulfide compounds and coupling agents, nor to any particular modifier or solvent. Similarly, the examples of compounding the invention polymers to form rubber compounds have been provided merely to demonstrate the practice of the subject invention and do not constitute limitations of the invention. Thus, it is believed that any of the variables disclosed herein can readily be determined and controlled without departing from the scope of the invention herein disclosed and described.

In each of the following polymerization examples, the exemplary styrene-butadiene rubber (SBR) was prepared under anhydrous and anaerobic conditions in a jacketed, stainless steel reactor fitted with a stirrer.

Example 1

Synthesis of Hexamethyleneimine Initiated Thioalkoxysilane Treated Coupled SBR

To a two gallon nitrogen-purged reactor was charged 1.10 kilograms (kg) hexane, 0.48 kg of 33 percent by weight styrene in hexane, and 2.92 kg of 21.8 percent by weight butadiene in hexane. Then 1.79 milliliters (mL) of 3.54 molar (M) 2-2'-di(tetrahydrofuryl) propane in hexane, and 5.29 mL of 1.5 M n-butyl lithium in hexane were charged into the reactor, and the jacket temperature was set to 63° C. After 34 minutes, a sample of the resulting polymer cement was taken from the reactor, treated with 2,6-di-tert-butyl-4-methylphenol antioxidant, coagulated with isopropanol and drum dried. This sample had the following properties: $M_n=1.05\times10^5$ grams/mole (g/mol), and $M_w=1.24\times10^5$ g/mol.

To the remaining polymer cement in the reactor was added 20 mL of dry tetrahydrofuran followed by 11.91 mL of 0.5 M propylene sulfide in hexane. After 15 minutes, a sample was taken from the reactor and treated as above. The sample had the following properties: $M_n=1.16\times10^5$ g/mol and $M_w=1.47\times10^5$ g/mol.

To the reactor was then added 7.94 mL of 0.25 M silicon tetrachloride. After 15 minutes, the polymer cement in the reactor was discharged into isopropanol and drum dried. The polymer had the following characteristics: $M_n=1.27\times10^5$ g/mol, $M_w=1.82\times10^5$ g/mol, $ML_{1+4}$ (100° C.)=60.3, $T_{80}$=4.7 seconds, percent styrene=21.4%, percent 1,2 butadiene= 18.8%, $T_g$=−67.7.7° C. This sample is a polymeric sulfide compound of the invention, designated as Coupled Polymer in Table 1 below.

Synthesis of Control Polymer

The control polymer was not treated with an alkylene sulfide compound and was not coupled.

To a two gallon nitrogen purged reactor was charged 1.07 kg hexane, 0.48 kg of 33 percent by weight styrene in hexane, and 2.95 kg of 21.6 percent by weight butadiene in hexane. Then, 1.79 mL of 3.54 M hexamethyleneimine in hexane, 0.49 mL of 1.6 M 2-2'-di(tetrahydrofuryl) propane in hexane, and 5.29 mL of 1.5 M butyllithium in hexane were added to the reactor and the reactor jacket set to 63° C. After 39 minutes, the polymer was discharged, treated with the antioxidant and terminated with isopropanol. The polymer cement was then drum dried to yield a polymer with the following characteristics: $M_n=9.5\times10^4$ g/mol, $M_w=1.06\times10^5$ g/mol, $ML_{1+4}$(100° C.)=30, $T_{80}$=1.4 seconds, percent styrene=22.1%, percent 1.2 butadiene=16.6%, $T_g$=−71.0° C.

Comparison of Physical Properties of the Control and Invention Gum Polymers

As expected, the number average molecular weight ($M_n$) and the Mooney viscosity ($ML_{1+4}$) of the propylene sulfide-modified, chain coupled polymer are all higher than that of the control unmodified polymer, and are within a desirable range of values.

Compounding of the Polymers to Form Control and Invention Vulcanizable Elastomeric Compounds The control and alkylene sulfide-modified, coupled polymers were compounded according to the formulation presented in Table 1. Each rubber compound was prepared in four stages, i.e., initial stage, remill 1, remill 2, and final stage. The material was milled and allowed to cool between each stage. The initial stage formulation was mixed in a 300 gram Brabender mixer beginning at 110° C. and mixing at 60 RPM until a drop temperature of 165° C. was achieved. In remills 1 and 2, the initial temperature was 110° C. and the drop temperature was 145° C. with a rotor speed of 60 RPM. The final stage was mixed at 40 RPM from 70° C. to 105° C.

The final product was then sheeted and cured at 171° C. for 15 minutes in standard molds placed in a hot press.

Physical Properties of the Control and Invention Vulcanizable Elastomeric Compounds The physical properties of the control compound and invention compound are illustrated in Table 2. The Mooney viscosity was measured according to ASTM D-1646; the tensile properties were obtained according to ASTM D-412; ring tear was determined according to ASTM D-624; and Shore A Hardness was determined according to ASTM D-2240. All other tests were conducted by conventional methods known to those skilled in the art.

As illustrated in the Table, the Mooney viscosity ($ML_{1+4}$) of the invention vulcanizable elastomeric compound containing the chain-coupled polymeric sulfide compound was greater than that of the control compound, which did not contain coupled polymers, indicating that the uncoupling of polymer chains was not complete over the course of mixing. However, the mixing time required to achieve the target temperature is faster for the invention compound than the control compound, indicating an increase in the efficiency of mixing of the invention compound compared to the control compound (data not shown).

The invention compound containing the chain-coupled polymeric compound exhibits much lower hysteresis at higher temperatures than the control compound, as indicated by a higher rebound value at 50° C. and a lower tan δ value at 60° C. In addition, the invention compound shows better tensile strength than the control compound at both room temperature and 100° C. The invention compound also exhibited a better filler dispersion, illustrated by the higher dispersion index, compared to the control compound.

TABLE 1

Compounding Ingredients

|  | Control Polymer | Coupled Polymer |
|---|---|---|
| Initial Stage | | |
| Control Polymer | 67 | 0 |
| Coupled Polymer | 0 | 67 |
| Butadiene rubber | 33 | 33 |
| Silica | 10 | 10 |
| Clay | 10 | 10 |
| Carbon Black | 40 | 40 |

TABLE 1-continued

Compounding Ingredients

|  | Control Polymer | Coupled Polymer |
|---|---|---|
| Aromatic oil | 28 | 28 |
| Wax | 0.5 | 0.5 |
| Fatty acid ester processing aid | 3.0 | 3.0 |
| Fatty acid | 1.0 | 1.0 |
| Total First Remill | 192.5 | 192.5 |
| Initial material | 192.5 | 192.5 |
| Silica | 25.0 | 25.0 |
| Silica coupling agent* | 5.14 | 5.14 |
| Total Second Remill | 222.64 | 222.64 |
| First remill material | 222.64 | 222.64 |
| Total Final Stage | 222.64 | 222.64 |
| Second remill material | 222.64 | 222.64 |
| Zinc oxide | 1.7 | 1.7 |
| Antioxidant | 0.95 | 0.95 |
| Sulfur | 2.3 | 2.3 |
| Accelerators | 2.4 | 2.4 |
| Total | 229.99 | 229.99 |

TABLE 2

Properties of the Vulcanizable Elastomeric Compounds

Monsanto Cure @ 171° C.

|  | Control Polymer | Coupled Polymer |
|---|---|---|
| ML | 3.24 | 4.28 |
| MH | 18.6 | 20.59 |
| $t_s2$ | 1.34 | 1.22 |
| $t_c90$ | 4.21 | 5.33 |
| tan δ @ MH | 0.212 | 0.191 |
| $ML_{1+4}$ | 58.7 | 82.0 |
| Scorch (seconds) | 651 | 563 |

|  | Control | Coupled |
|---|---|---|
| Tensile Properties | | |
| 50% Modulus, psi, RT | 299 | 257 |
| 300% Modulus, psi, RT | 1371 | 1515 |
| Tensile Strength., psi, RT | 2176 | 2554 |
| % Elongation, RT | 445 | 457 |
| 200% Modulus, psi, 100° C. | 351 | 289 |
| Physical Properties | | |
| Shore A, RT (peak) | 77.1 | 76.4 |
| Shore A, 100° C. (peak) | 67.8 | 66.8 |
| Pendulum Rebound 23° C. | 35 | 36.6 |
| Pendulum Rebound 50° C. | 40.2 | 43.2 |
| Tear Strength, ppi @ 171° C. | 215 | 238 |
| Dispersion Index #1 | 75.8 | 81.5 |
| Wet Stanley London | 55 | 57 |
| Rheometrics @ 3.14 rad/sec | | |
| tan δ @ 2% E & 0° C. | 0.311 | 0.305 |
| G' (MPa) @ 0.2% E & −20° C. | 70.508 | 67.969 |
| tan δ @ 2% E & 25° C. | 0.314 | 0.304 |
| tan δ @ 2% E & 60° C. | 0.292 | 0.272 |

Example 2

In this Example, a comparison is made between properties of vulcanizable elastomeric compounds containing the invention chain-coupled polymeric sulfide (SiSP coupled) compound and those containing a chain-coupled polymeric alkoxide compound (SiOP coupled), disclosed in our co-owned, copending U.S. patent application Ser. No. 09/570,578. The main difference between the compounds is that the polymer chains of the SiSP compounds were end-capped with a sulfide prior to chain coupling; whereas, the polymer chains of the SiOP compounds were encapped with an alkoxide prior to chain coupling. The vulcanizable elastomeric compounds contain carbon black as the only reinforcing filler.

Synthesis of Hexamethyleneimine Initiated SiOP Coupled Polymer

To a two gallon nitrogen purged reactor was added 1.09 kg hexane, 0.48 kg 33.3 percent by weight styrene in hexane, and 2.92 kg of 21.8 percent by weight butadiene in hexane. Then, 1.79 mL of 3.54 M hexamethylene imine in cyclohexane, 0.49 mL of 1.6 M 2,2'-di(tetrahydrofuryl)propane in hexane, and 5.29 mL of 1.5 M butyllithium were charged into the reactor and the jacket temperature set to 62.7° C. After 35 minutes, 20 mL tetrahydrofuran and 11.91 mL of 0.5 M cyclohexene oxide in hexane were added. After an additional 7 minutes, 7.94 mL of 0.25 M silicon tetrachloride in hexane was added. The cement was removed from the reactor, treated with 2,6-di-tert-butyl-4-methylphenol, coagulated with isopropanol and drum dried. This polymer is designated SiOP Coupled in the Tables below.

Synthesis of Hexamethyleneimine Initiated SiSP Coupled Polymer

To a two gallon nitrogen purged reactor was added 1.09 kg hexane, 0.438 kg 33.3 percent by weight 3.54 M hexamethylene imine in cyclohexane, 0.49 mL of 1.6 M 2,2'-di(tetrahydrofuryl)propane in hexane, and 5.29 mL of 1.5 M butyllithium were charged into the reactor and the jacket temperature set to 62.7° C. After 35 minutes, 20 mL tetrahydrofuran and 11.91 mL of 0.5 M propylene sulfide in hexane were added. After an additional 7 minutes, 7.94 mL of 0.25 M silicon tetrachloride in hexane was added. The cement was removed from the reactor, treated with 2,6-di-tert-butyl-4-methylphenol, coagulated with isopropanol and drum dried. This polymer is designed SiSP Coupled in the Tables below. A comparison of the properties of the SiOP coupled and SiSP coupled polymers is given in Table 3.

TABLE 3

| Property | SiOP Coupled | SiSP Coupled |
|---|---|---|
| $M_n(\times 10^{-5})$ g/mol | 1.39 | 1.27 |
| $M_w(\times 10^{-5})$ g/mol | 2.37 | 1.82 |
| Polydispersity | 1.70 | 1.43 |
| Percent Coupling | 35.6 | 29.7 |
| $T_g$(° C.) | −67.9 | −67.7 |
| $ML_{1+4}$ | 76.0 | 60.3 |
| % Styrene | 21.1 | 21.4 |
| % Block Styrene | 7.8 | 7.9 |
| % 1,4-Butadiene | 60.6 | 59.8 |
| % 1,2-Butadiene | 18.3 | 18.8 |

Compounding of the SiOP Coupled and SiSP Coupled Polymers

The formulations for the compounding are presented in Table 4. Each rubber compound was prepared in three states, namely initial stage, remill and final stage. The initial stage was mixed in a 300 g Brabender mixer operating at 60 RPM and 110° C. The ingredients were added and the mixing continued until a temperature of 165° C. was achieved.

The remill stage was mixed by adding the initial stage into the mixer operating at 60 RPM and 101° C. The mixing was continued until a temperature of 145° C. was achieved.

The final stage was mixed by adding the remill material and curatives into the mixer operating at 70° C. and 40 RPM. The final material was removed from the mixer after a temperature of 105° C. was achieved. The finals were then sheeted and cured at 165° C. for 20 minutes in standard molds placed in a hot press.

Physical Properties of the Vulcanizable Elastomeric Compounds

The physical properties of the SiOP coupled polymer-containing compound and the SiSP coupled polymer-containing compound are illustrated in Table 5.

As illustrated in the Table, the invention compound containing the SiSP coupled polymer shows a much lower tan δ at 60° C. than the compound containing the SiOP coupled polymer, and an equivalent tan δ at 0° C. This finding indicates that a tire tread comprising the vulcanized elastomeric compound containing the SiSP coupled polymer will exhibit better rolling resistance, while maintaining similar wet traction properties.

FIG. 1 is a graph of the complete temperature vs. tan δ curves for the two vulcanizable elastomeric compounds.

TABLE 4

Compounding Ingredients

| | SiOP Coupled Polymer | SiSP Coupled Polymer |
|---|---|---|
| Initial Stage | | |
| SiOP Coupled Polymer | 70 | 0 |
| SiSP Coupled Polymer | 0 | 70 |
| Natural rubber | 30 | 30 |
| Carbon Black | 41 | 41 |
| Oil | 10.5 | 10.5 |
| Fatty acid | 2.0 | 2.0 |
| Zinc oxide | 2.5 | 2.5 |
| Wax and Antioxidant | 1.95 | 1.95 |
| Total | 157.95 | 157.95 |
| Remill | | |
| Initial material | 157.95 | 157.95 |
| Total | 157.95 | 157.95 |
| Final Stage | | |
| Remill material | 157.95 | 157.95 |
| Sulfur | 1.3 | 1.3 |
| Accelerators | 1.9 | 1.9 |
| Total | 161.15 | 161.15 |

TABLE 5

Comparison of Properties of the Vulcanizable Elastomeric Compounds

| Property | SiOP Compound | SiSP Compound |
|---|---|---|
| MH-ML | 11.57 | 11.19 |
| ML4 (130° C.) | 41.6 | 41.1 |
| Scorch (min) | 21.8 | 21.2 |
| T$_b$ (RT, psi) | 2350 | 2625 |
| E$_b$ (RT) | 544 | 543 |
| 200% RT Mod (psi) | 698 | 716 |
| Lambourn (65% slip) | 0.96 | 0.95 |

TABLE 5-continued

Comparison of Properties of the Vulcanizable Elastomeric Compounds

| Property | SiOP Compound | SiSP Compound |
|---|---|---|
| Bound Rubber | 39.34 | 40.81 |
| tan δ, 60° C. | 0.155 | 0.129 |
| G', -20° C., MPa | 2.062 | 8.496 |
| tan δ, 24° C. | 0.292 | 0.290 |
| tan δ, 0° C. | 0.300 | 0.301 |

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

We claim:

1. A polymeric sulfide compound having the formula $$(PS)_n M^{+z} P'_{z-n}$$

where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z.

2. The compound of claim 1, wherein the metal atom M is selected from the group consisting of atoms of silicon, tin, titanium, aluminum, arsenic, copper, calcium, zinc, lead, mercury and cadmium.

3. The compound of claim 1, wherein the polymer chain P is selected from the group consisting of homopolymers of conjugated diene monomers, and copolymers and terpolymers of the conjugated diene monomers with monovinyl aromatic monomers and trienes.

4. The compound of claim 3, wherein the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

5. The compound of claim 1, wherein the polymer chain is selected from the group consisting of homopolymers, copolymers and terpolymers of alkylene sulfide monomers, and homopolymers, copolymers and terpolymers of alkylene oxide monomers.

6. The compound of claim 5, wherein the alkylene sulfide and alkylene oxide monomers are selected from the group of monomers consisting of ethylene sulfide, propylene sulfide, styrene sulfide cyclohexene sulfide, cyclopentene sulfide, ethylene oxide, propylene oxide, styrene oxide, cyclohexene oxide, and cyclopentene oxide.

7. A method of making a polymeric sulfide compound having the formula $$(PS)_n M^{+z} P'_{z-n}$$

where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; $M^{+z}$ is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z, comprising the steps of:

providing a polymer chain prepared by anionic solution polymerization and comprising a living end, reacting the living end of the polymer chain, after polymerization but while still in the presence of an inert solvent, with an alkylene sulfide compound;

subsequently reacting the resulting polymer chain, while still in the presence of the inert solvent, with a coupling agent having the formula $$M^{+z}X_{z-m}R_m$$

where $M^{+z}$ and R are the same as above, X is a halide; (z−m) represents an integer having a value of at least 2, and m is an integer having a value of zero to (z−2).

8. The method of claim 7, wherein M is a metal atom selected from the group consisting of atoms of silicon, tin, titanium, aluminum, arsenic, copper, calcium, zinc, lead, mercury and cadmium.

9. The method of claim 8, wherein the metal atom is silicon.

10. The method of claim 7, wherein the alkylene sulfide compound has the formula

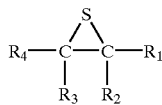

where $R_1$, $R_2$, $R_3$ and $R_4$ are the same of different from each other, and are independently selected from the group consisting of hydrogen atoms, alkyls having one to about 30 carbon atoms, aromatics having about 6 to about 20 carbon atoms, and cycloalkyls having about 5 to about 20 carbon atoms.

11. The method of claim 9, wherein the alkylene sulfide is selected from the group consisting of ethylene sulfide, propylene sulfide, cyclohexene sulfide, cyclopentene sulfide and styrene sulfide.

12. The method of claim 7, wherein the coupling agent is selected from the group consisting of silicon tetrachloride, alkyltrichlorosilane, dialkyldichlorosilane, silicon tetrabromide, alkyltribromosilane, dialkyldibromosilane, tin tetrachloride, alkyl tin trichloride, dialkyl tin dichloride, tin tetrabromide, alkyl tin tribromide, dialkyl tin dibromide, titanium tetrachloride, alkyl titanium trichloride, dialkyl titanium dichloride, titanium tetrabromide, alkyl titanium tribromide, dialkyl titanium dibromide, aluminum trichloride, alkyl aluminum dichloride, aluminum tribromide, alkyl aluminum dibromide, arsenic trichloride, alkyl arsenic dichloride, arsenic tribromide, alkyl arsenic dibromide, boron trichloride, alkyl boron dichloride, boron tribromide, alkyl boron dibromide, nitrogen trichloride, alkyl nitrogen dichloride, nitrogen tribromide, alkyl nitrogen dibromide, phosphorus trichloride, alkyl phosphorus dichloride, phosphorus tribromide, alkyl phosphorus dibromide, copper dichloride, copper dibromide, calcium dichloride, calcium dibromide, zinc dichloride, zinc dibromide, sulfur dichloride, and mixtures thereof.

13. The method of claim 7, wherein the polymer chain having the living end is selected from the group consisting of homopolymers, copolymers and terpolymers of alkylene sulfide monomers, and homopolymers, copolymers and terpolymers of alkylene oxide monomers.

14. The method of claim 12, wherein the alkylene sulfide and alkylene oxide monomers are selected from the group of monomers consisting of ethylene sulfide, propylene sulfide, styrene sulfide cyclohexene sulfide, cyclopentene sulfide, ethylene oxide, propylene oxide, styrene oxide, cyclohexene oxide, and cyclopentene oxide.

15. The method of claim 7, wherein the polymer chain having the living end is selected from the group consisting of homopolymers of conjugated diene monomers, and copolymers and terpolymers of the conjugated diene monomers with monovinyl aromatic monomers and trienes.

16. The method of claim 14, wherein the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

17. A vulcanizable elastomeric compound comprising a polymeric sulfide compound having the formula $$(PS)_n M^{+z} P'_{z-n}$$

where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z;

a reinforcing filler selected from the group consisting of silica, carbon black, and mixtures thereof; and a cure agent including sulfur.

18. The compound of claim 16, wherein the polymer chain P is selected from the group consisting of homopolymers of conjugated diene monomers, and copolymers and terpolymers of the conjugated diene monomers with monovinyl aromatic monomers and trienes.

19. The compound of claim 17, wherein the polymer chain is selected from the group consisting of polyisoprene, polybutadiene, butadiene-isoprene copolymer, butadiene-isoprene-styrene terpolymer, isoprene-styrene copolymer, and styrene-butadiene copolymer.

20. The compound of claim 16, wherein M is a metal atom selected from the group consisting of atoms of silicon, tin, titanium, aluminum, arsenic, copper, calcium, zinc, lead, mercury and cadmium.

21. The compound of claim 16, wherein the metal atom or nonmetal atom is derived from a coupling agent for the polymer chains, selected from the group consisting of silicon tetrachloride, alkyltrichlorosilane, dialkyldichlorosilane, silicon tetrabromide, alkyltribromosilane, dialkyldibromosilane, tin tetrachloride, alkyl tin trichloride, dialkyl tin dichloride, tin tetrabromide, alkyl tin tribromide, dialkyl tin dibromide, titanium tetrachloride, alkyl titanium trichloride, dialkyl titanium dichloride, titanium tetrabromide, alkyl titanium tribromide, dialkyl titanium dibromide, aluminum trichloride, alkyl aluminum dichloride, aluminum tribromide, alkyl aluminum dibromide, arsenic trichloride, alkyl arsenic dichloride, arsenic tribromide, alkyl arsenic dibromide, boron trichloride, alkyl boron dichloride, boron tribromide, alkyl boron dibromide, nitrogen trichloride, alkyl nitrogen dichloride, nitrogen tribromide, alkyl nitrogen dibromide, phosphorus trichloride, alkyl phosphorus dichloride, phosphorus tribromide, alkyl phosphorus dibromide, copper dichloride, copper dibromide, calcium dichloride, calcium dibromide, zinc dichloride, zinc dibromide, sulfur dichloride, and mixtures thereof.

22. A pneumatic tire comprising a component produced from a vulcanized elastomeric compound having the formula $(PS)_n M^{-z} P'_{z-a}$ where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z;

a reinforcing filler selected from the group consisting of silica, carbon black, and mixtures thereof, and a cure agent including sulfur.

23. The tire of claim 21, wherein the polymer chain P is selected from the group consisting of homopolymers of conjugated diene monomers, and copolymers and terpolymers of the conjugated diene monomers with monovinyl aromatic monomers and trienes.

24. The tire of claim 22, wherein the polymer chain is selected from the group consisting of polyisoprene, polybutadiene, butadiene-isoprene copolymer, butadiene-isoprene-styrene terpolymer, isoprene-styrene copolymer, and styrene-butadiene copolymer.

25. A method for improving mixing efficiency during compounding of an elastomer with a reinforcing filler, comprising the steps of:

providing a polymeric sulfide compound having the formula $(PS)_n M^{+z} P'_{z-n}$ where P is a polymer chain; S is sulfur; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; $M^{+z}$ is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z, mixing the polymeric sulfide compound in a mixer with a reinforcing filler selected from the group consisting of silica, carbon black, and mixtures thereof, providing a source of moisture;

heating the mixture to a temperature of about 60° C. to about 200° C.;

wherein during the mixing step up to "n" S-M groups are hydrolyzed in the presence of the moisture and heat resulting in uncoupling of up to "n" polymer chains and a decrease in the viscosity of the mixture.

26. The method of claim 24, wherein M is a metal atom selected from the group consisting of atoms of silicon, tin, titanium, aluminum, arsenic, copper, calcium, zinc, lead, mercury and cadmium.

27. The method of claim 24, wherein P' is a polymer chain P and, during the mixing step, up to "z–n" polymer chain carbon-M group bonds are cleaved, resulting in a further decrease in the viscosity of the mixture.

28. The method of claim 24, wherein the polymer chain P is selected from the group consisting of homopolymers of conjugated diene monomers, and copolymers and terpolymers of the conjugated diene monomers with monovinyl aromatic monomers and trienes.

29. The method claim 28, wherein the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

* * * * *